Figure 1:
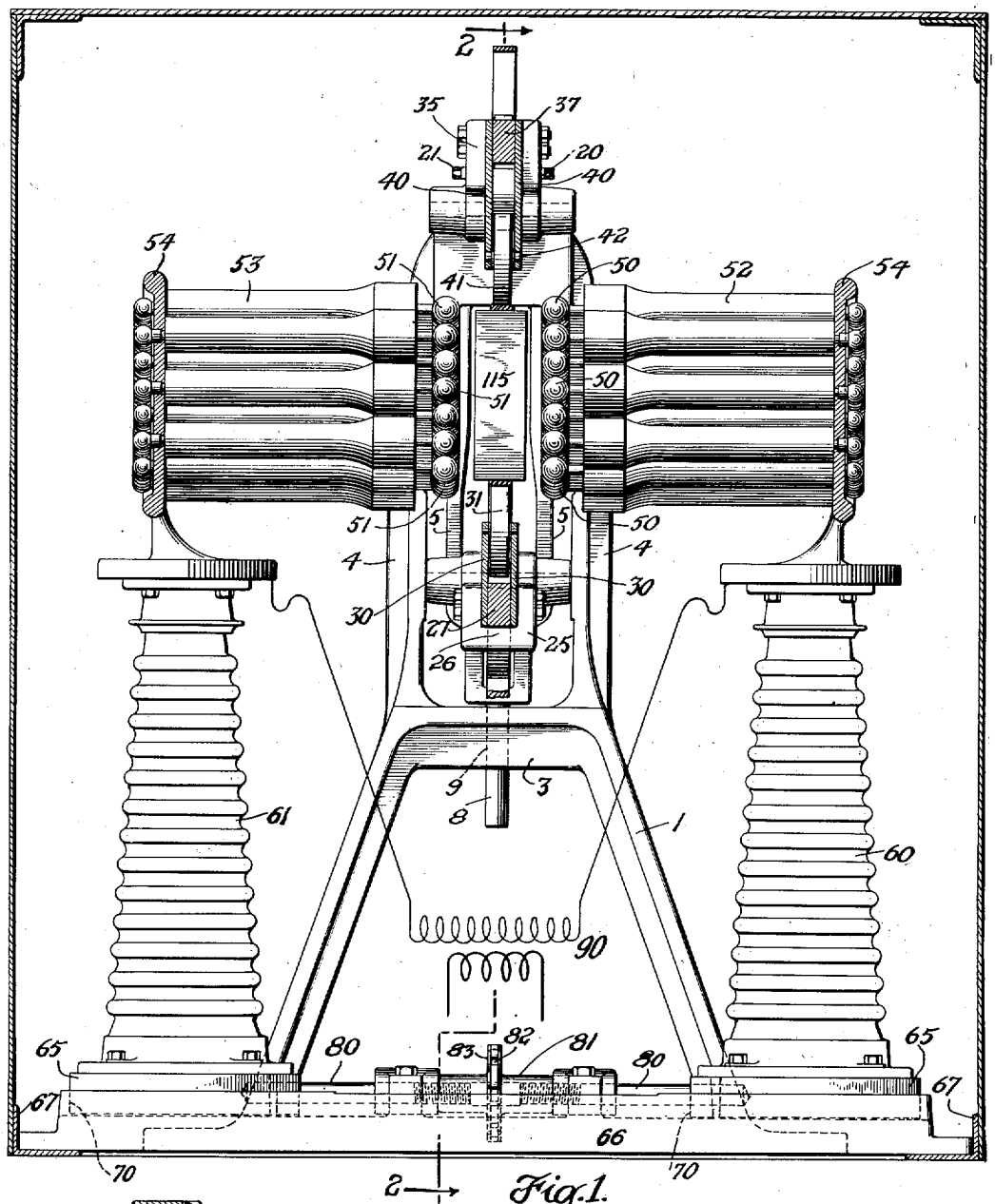

F. S. SMITH.

APPARATUS FOR TREATING ARTICLES BY DISRUPTIVE CONDUCTION.

APPLICATION FILED APR. 6, 1922.

Reissued May 9, 1922. 15,351.

3 SHEETS—SHEET 1.

INVENTOR.

Franklin S. Smith

BY

Cyrus N. Anderson

ATTORNEY.

F. S. SMITH.
APPARATUS FOR TREATING ARTICLES BY DISRUPTIVE CONDUCTION.
APPLICATION FILED APR. 6, 1922.
Reissued May 9, 1922.
15,351.
3 SHEETS—SHEET 2.
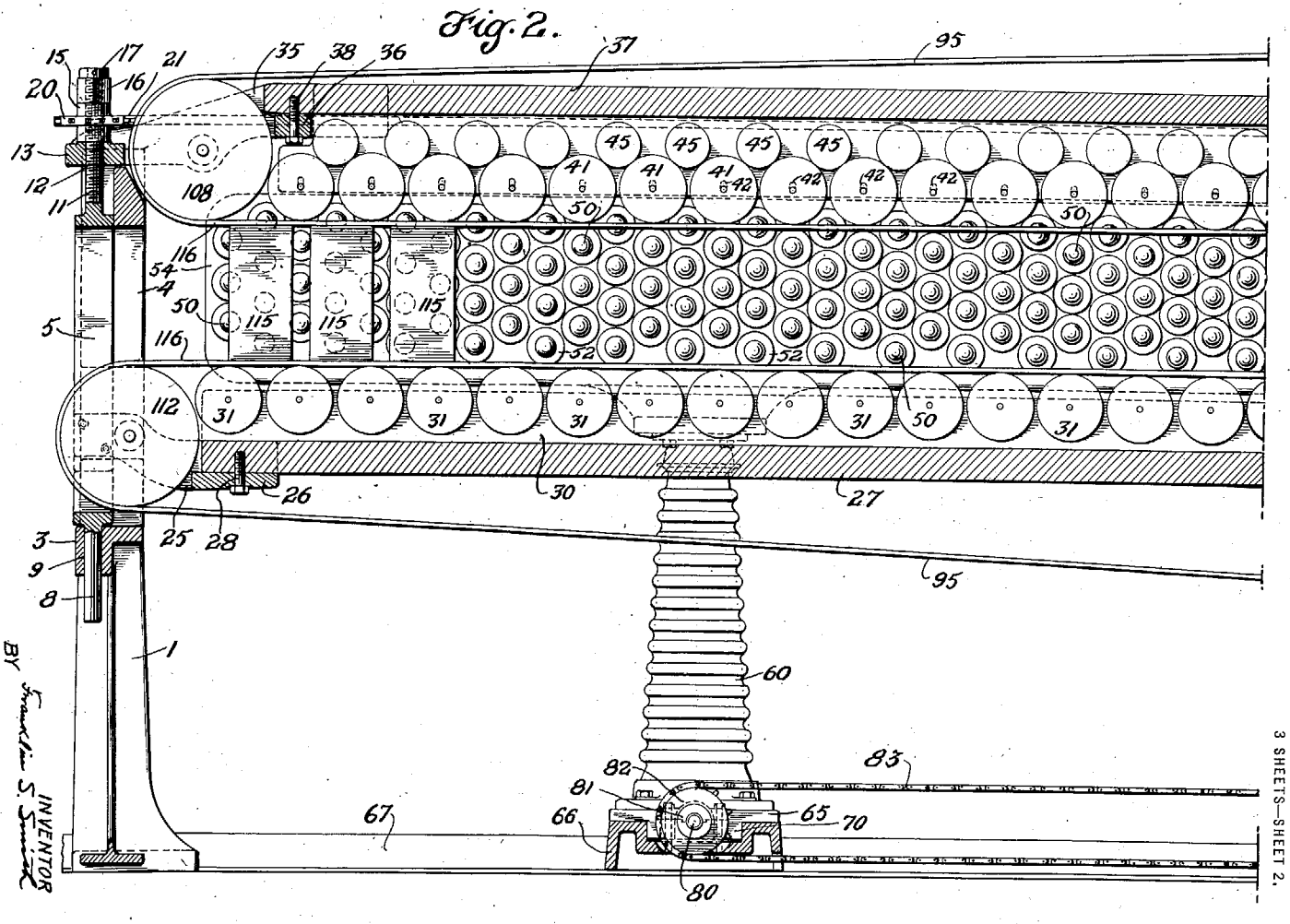
INVENTOR
Franklin S. Smith
BY
Cyrus N. Anderson
ATTORNEY.

F. S. SMITH.

APPARATUS FOR TREATING ARTICLES BY DISRUPTIVE CONDUCTION.

APPLICATION FILED APR. 6, 1922.

Reissued May 9, 1922.

15,351.

3 SHEETS—SHEET 3.

INVENTOR.

Franklin S. Smith

BY

Geo. N. Anderson

ATTORNEY.

UNITED STATES PATENT OFFICE.

FRANKLIN S. SMITH, OF PHILADELPHIA, PENNSYLVANIA.

APPARATUS FOR TREATING ARTICLES BY DISRUPTIVE CONDUCTION.

15,351. Specification of Reissued Letters Patent. Reissued May 9, 1922.

Original No. 1,399,161, dated December 6, 1921, Serial No. 285,485, filed March 27, 1919. Application for reissue filed April 6, 1922. Serial No. 550,857.

*To all whom it may concern:*

Be it known that I, FRANKLIN S. SMITH, a citizen of the United States, and a resident of Philadelphia, in the county of Philadelphia and State of Pennsylvania, have invented an Improvement in Apparatus for Treating Articles by Disruptive Conduction, of which the following is a specification.

My invention relates to apparatus for treating grain, beans, milled cereals, dried fruits, etc., also furs, woollens and the like, by disruptive conduction, and it has for one of its objects to provide means whereby the condensers or elastors may be adjusted toward and from each other; also to provide means whereby a single, uninterrupted belt may be employed to convey or carry the articles to be treated between the opposing groups of elastors, thereby preventing relative slippage between the adjacent opposing sections of belt between which the articles are carried. Heretofore where a plurality of belts have been employed, if one of them slipped, thereby causing relative movement between the belts, the articles held between the opposing parts of the conveyer belts would be caused to assume a twisted or abnormal position with respect to the belts.

A further object of my invention is to provide means whereby the spans of the conveyer belt by means of which the boxes or other objects to be treated are conveyed through the apparatus may be adjusted toward and from each other to thereby accommodate boxes or other objects of different sizes.

My invention also has for an object the provision of certain improvements in details of construction as will be more specifically pointed out in the detailed description which follows.

Other objects and advantages of my invention will be pointed out in the detailed description thereof which follows or will be apparent from such description.

In order that my invention may be more readily understood and its practical advantages fully appreciated and comprehended, reference should be had to the accompanying drawings in which I have illustrated one form of a convenient embodiment thereof.

Figure 3:
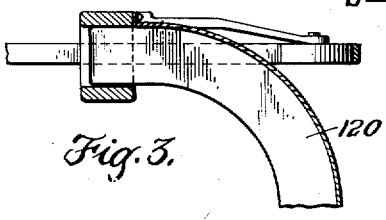
Figure 2A:
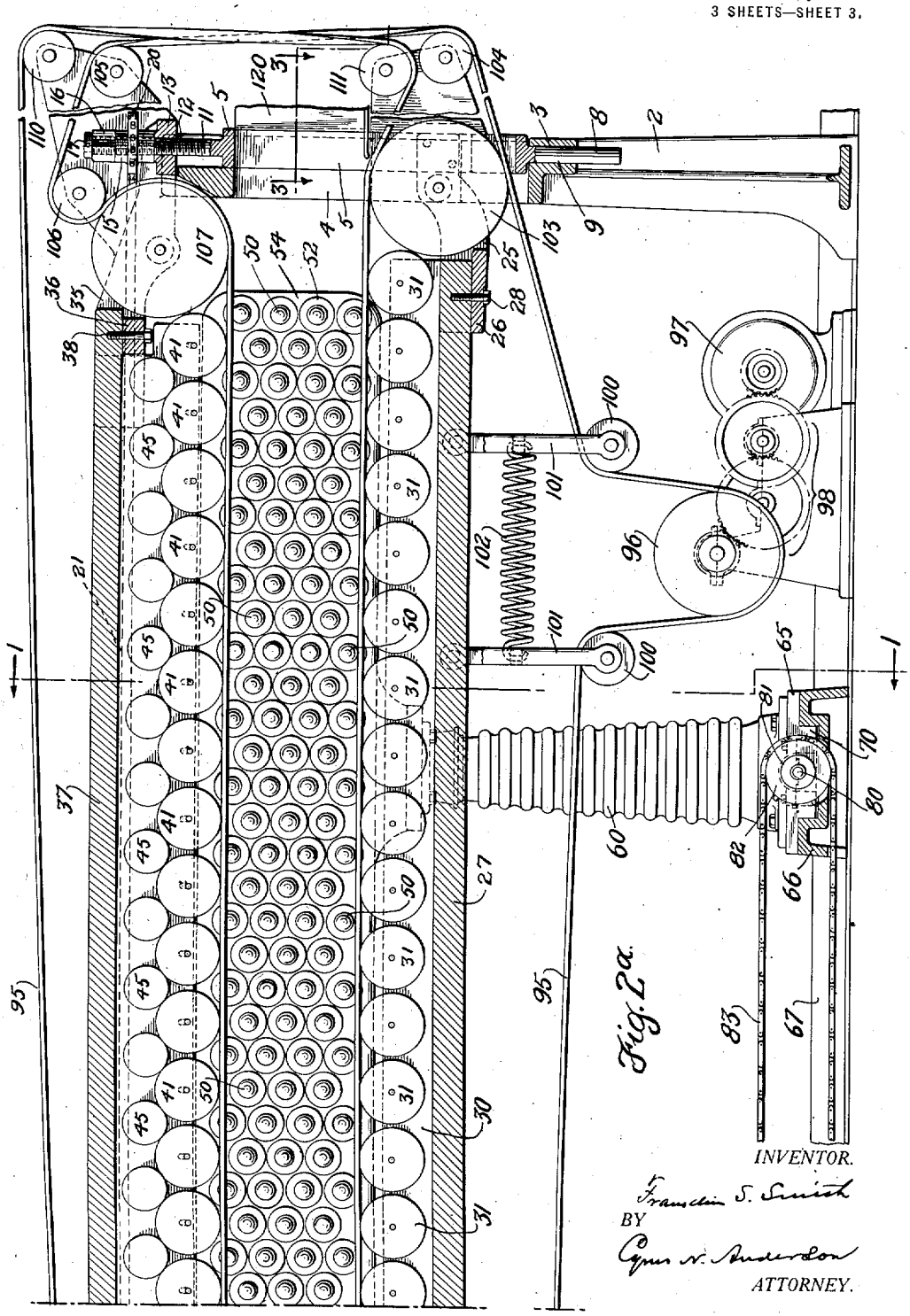

In the drawings:

Fig. 1. is a view in transverse section, certain of the parts being shown in section and others in elevation;

Fig. 2. is a central longitudinal sectional view of one-half of the machine taken on the line 2—2 of Fig. 1;

Fig. $2^a$ is a similar view of the other half of the machine taken on the same line; and Fig. 3 is a horizontal sectional view taken on the line 3—3 of Fig. $2^a$, showing a detail of construction.

Referring to the drawings:—1 and 2 designate supporting frame structures situated at the opposite ends of the apparatus and upon which portions of the said apparatus are supported. The said frame supporting structures 1 and 2 are each provided with converging leg portions, the upper ends of which are connected by a cross bar or head portion 3. The leg portions are continued above the bar 3 by the extensions 4 which are in substantially parallel arrangement as shown in Fig. 1. The upper ends of the extensions 4 are connected as shown. In the spaces formed by the extensions 4 adjustable oblong yoke like members 5 are supported. At their lower ends these members are respectively provided with projecting stem portions 8 which extend through openings 9 in the cross parts 3. Projecting from the upper ends of these members 5 are screw threaded stem-like portions 11, each of which extends through an opening 12 through a bar 13 at the upper end of the supporting frame structures at the ends of the apparatus.

15 designates the hubs of sprocket wheels, one at each end of the apparatus, which have screw threaded connection with the screw threaded stems 11. The lower ends of these hubs are seated against the upper sides of the bars 13 in consequence of which, when the hubs are rotated, movement of the stems 11 together with the frames 5 to which they are connected, is effected, either in one direction or the other,—up or down.

The upper ends of the hubs are extended as indicated at 16 and are adapted to contact with the stop rings 17 which are secured to the upper ends of the threaded stems 11. This occurs when the yoke members 5 and stems 11 are in their lowermost positions as shown in the drawings. The presence of the stops 17 prevents the screwing of the hubs 15 accidentally off the stems 11.

Sprocket wheels 20 are integrally or otherwise connected with the said hubs 15. These sprocket wheels are operated by a sprocket chain 21 in engagement therewith. The said chain is endless as shown. By taking hold of the said chain and causing movement thereof, simultaneous rotative movement of the sprocket wheels 20 and the screw threaded hubs 15 is effected so as to cause simultaneous vertical movements either up and down of the screw threaded stems 11 and of the oblong frames 5 connected therewith, and also such parts of the apparatus as may be supported upon the parts 5.

When the hubs 15 are caused to rotate in one direction the parts 5 will be lifted and when in the opposite direction such parts will be lowered.

25 designates brackets secured to the parts 5, said brackets having cross connections 26 at their inner ends as shown in the drawings. 27 designates a narrow bar with its opposite ends resting upon the cross parts 26 and secured thereto by means of screw threaded bolts 28. Secured to the opposite sides of the bar 27 are the side plates 30 arranged in parallel relation as indicated and relatively near to each other as shown in Fig. 1 of the drawings. 31 designates a series of rollers rotatably mounted upon the said plates as shown, said rollers being situated between the plates.

35 designates brackets secured to the upper ends of the frame supporting structures 1 situated at the opposite ends of the apparatus. The inner ends of each of these brackets are connected by a cross member 36. 37 designates a bar extending between the brackets 35 and having its opposite ends resting upon the cross parts 36 and secured thereto by means of screw threaded bolts 38. 40 designates parallel plates secured to the opposite sides of the bar 37. Mounted upon these plates, intermediate thereof, adjacent their lower edges, are the rollers 41, the trunnions of which project into slot openings 42 in the said plates. The rollers 41 are situated close together as shown as are the rollers 31.

45 designates weights of disk-like form resting upon the upper peripheral edges of the rollers 41, said weights respectively being situated intermediate adjacent rollers as shown and tending to hold the said rollers in their lowermost positions.

These rollers 31 and 41 are situated in a plane situated centrally and extending longitudinally of the apparatus.

Such plane is midway between the opposite groups or sets of electrodes 50 and 51 which project from the respective elastors of the two groups of elastors situated at the opposite sides of the machine. These respective groups of elastors are designated by the reference numerals 52 and 53. The said elastors of each group are supported upon plates 54 and are connected in multiple. These plates are in turn supported upon the post insulators 60 and 61 situated opposite sides of the apparatus. There are four of these insulators and they are arranged in couples as shown, the insulators 60 constituting one couple and the insulators 61 another. The said posts are each connected at their lower ends to base members 65 which are in turn slidably supported upon cross sill members 66 which extend transversely of the machine and the opposite ends of which rest upon the horizontal flanges of the side angle members 67, as best shown in Fig. 1 of the drawings. The base members 65 are each provided with a central depending portion 70 which fits in a complemental shaped depression or opening in the upper side of the sills 66. The opposite side portions of the base member 65 rest upon the top sides of the sills 66 as shown in Figs. 2 and 3 of the drawings.

The base members 65 supporting the respective couples of posts 60 and 61 are connected together by means of rods 80 and what may be termed a turn buckle connection 81. These rods 80 and the part 81 are provided in connection with oppositely disposed post insulators at the opposite end portions of the machine. Each of the parts 81 is provided with a sprocket wheel 82 over which passes a sprocket chain 83. By pulling this chain so as to cause movement thereof in one direction or the other the insulating posts 60 and 61 at the opposite end portions of the apparatus are caused to move toward or away from each other. By thus adjusting the posts on opposite sides of the apparatus toward and from each other, the two groups or sets of elastors and electrodes are caused to move toward or from each other as may be desired so as to increase or diminish the distance between the opposing groups or sets of electrodes.

The opposing sets of elastors are connected to the opposite sides of a step up transformer 90. The elastors are connected in series with each other through the spark gap between the opposing electrodes.

For the purpose of conveying the articles, whatever they may be, through the machine, between the opposing electrodes in order that they may be subjected to the action of a disruptive conductive current, I have provided a single or endless belt 95 driven by means of a drum 96 which in turn is driven by means of a motor 97. The motor and drum are connected by means of the gear mechanism indicated as a whole at 98. The portions of the conveyer belt upon opposite sides of the drum 96 by means of which the same is driven travel over the take up rolls 100 supported upon the lower ends of swinging links 101 drawn toward each other by means of a contractile spring 102.

Passing from the drum 96 toward the right, the belt 95 passes in contact with a roller 103, thence partially around and underneath a roller 104, thence upwardly toward the top of the machine where it passes partially around and over a roller 105, and thence over and partially around a roller 106. From this point the belt passes downwardly and around the right hand side of and underneath a roller 107 and thence underneath the weighted rollers 41 and around the outside of the relatively large roller 108 passing upwardly over the same, and thence toward the right above the top of the machine and partially around and over a roller 110; thence downwardly toward the lower side of the machine and partially around and underneath a roller 111; thence toward the left over and partially around the upper side of the roller 103; thence along the upper peripheral edges of the rollers 31, to the relatively large roller 112 at the left hand side of the machine, around the outside downwardly and underneath the same, and thence back to the drum 96. The rollers 41 are held down upon the portion of the belt underneath the same by their own weight and also by the weight of the disks 45.

In the construction shown the material being treated is contained in cartons, some of the latter being shown at 115 in Fig. 2 of the drawing. These cartons are fed in between the parallel portions 116 of the conveyer belt 95 at the left hand end of the machine. Any suitable platform or other means may be provided to facilitate the feeding of the cartons or other articles of different character which may be charged into the machine between the portions 116 of the belt. The portions 116 of the belt are adapted to contact with opposing portions of the article and hold and convey the same through the machine between the opposing groups of electrodes and elastors. The portions 116 of the belt are adapted to be adjusted toward and from each other to accommodate articles, whether in the form of cartons or otherwise, of different sizes. This is accomplished by rotating the sprocket wheels 20 to effect vertical adjustment of the parts 5 and such parts as may be carried thereby.

Should it become advisable or necessary to adjust the two sets of elastors and electrodes toward or from each other, this may be accomplished by pulling upon the sprocket chain 83 to effect simultaneous rotation of the sprocket wheel 82 to thereby effect simultaneous adjustment of the posts of the respective couples 60 and 61 toward or from each other depending upon the direction of rotation of the parts 81.

By reason of the fact that the conveyer belt 95 is continuous, it is obvious that there cannot be relative movement or slippage between the parts 116 thereof, between and by which the articles being treated are carried and supported. At the right hand end of the machine the articles are delivered to a delivery chute 120, which is curved laterally as indicated in Fig. 3. It is necessary in the construction shown to provide a curved delivery chute as shown because the upright portions of the belt intermediate the rollers 104 and 111 and 105 and 110 are situated in the line of the portions 116 of the belt, so that such upright portions of the belt occupy positions in alinement with the path of travel of the articles through the machine. Consequently it is necessary to provide means for their delivery at one side of the upright portions of the belt.

I claim:

1. In an apparatus of the character described, the combination of a plurality of sets of elastors and electrodes supported in opposing relation with respect to each other, posts for supporting each set of elastors, means for connecting the opposing posts supporting the said elastors, means for simultaneously adjusting the said opposing posts toward or from each other, an endless conveyer for conveying articles to be treated between the said opposing sets of electrodes, said conveyer comprising portions which are arranged in parallel relation with respect to each other, said portions being situated intermediate the said electrodes, and means for moving one of said portions toward or from the other to vary the distance between the same.

2. In an apparatus of the character described, the combination of two sets of elastors and electrodes having connection therewith, the said two sets of electrodes being arranged in opposing spaced relation to each other, an endless conveyer for conveying products through the space between said sets of electrodes, means at the opposite ends of said apparatus for supporting said conveyer with two portions thereof in parallel relation in said space, said means comprising members situated in opposed relation to each other at the opposite end portions of the apparatus, frame members situated at the opposite ends of said apparatus, said frame members supporting corresponding ones of said members at the opposite end portions of the apparatus, and means for adjusting said frame members to effect relative adjustment of said oppositely disposed members at each end of the apparatus toward and from each other to cause relative adjustment of the parallel portions of the said conveyer in the said space toward and from each other.

3. In an apparatus of the character described, the combination of a plurality of sets of elastors and electrodes supported in opposing relation with respect to each other, a plurality of couples of posts for supporting each set of elastors, the posts of each couple being situated in opposed relation with respect to each other, means for connecting the posts of each couple, said means comprising a turn buckle provided with a sprocket, and an endless sprocket chain engaging the sprockets of the respective connections whereby the said connections may be simultaneously adjusted to effect simultaneous adjustment of the posts of each couple toward or from each other.

4. In an apparatus of the character described, the combination of two sets of electrodes, means for effecting disruptive conduction across the gap between said electrodes, an endless conveyer for conveying articles across the said gap to effect treatment thereof, the portions of said conveyer between said electrodes being in parallel relation with respect to each other, adjustable frame-like devices situated at the opposite ends of the said apparatus, means for simultaneously adjusting each of the said devices vertically in either direction, and rollers supported upon the said devices for supporting one of the parallel sides of the said endless conveyer.

In testimony that I claim the foregoing as my invention I have hereunto set my name this 25th day of March A. D., 1919.

FRANKLIN S. SMITH.